(12) United States Patent
Lee et al.

(10) Patent No.: US 11,192,433 B2
(45) Date of Patent: Dec. 7, 2021

(54) SEALING ASSEMBLY FOR VEHICLE DOOR

(71) Applicants: Hyundai Motor Company, Seoul (KR); Kia Motors Corporation, Seoul (KR)

(72) Inventors: Jae-Seung Lee, Geonggi-do (KR); Dong-Hee Ma, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 118 days.

(21) Appl. No.: 16/696,344

(22) Filed: Nov. 26, 2019

(65) Prior Publication Data

US 2020/0338974 A1 Oct. 29, 2020

(30) Foreign Application Priority Data

Apr. 25, 2019 (KR) .................. 10-2019-0048590

(51) Int. Cl.
*B60J 1/00* (2006.01)
*B60J 10/86* (2016.01)
*B60J 10/23* (2016.01)

(52) U.S. Cl.
CPC ............ *B60J 10/86* (2016.02); *B60J 10/23* (2016.02)

(58) Field of Classification Search
CPC ........... B60J 10/86; B60J 10/23; B60J 5/0479
USPC .............................. 49/366, 367, 368; 296/150
See application file for complete search history.

(56) References Cited

U.S. PATENT DOCUMENTS

| 661,653 | A | * | 11/1900 | Youlten | E05D 7/081 |
| | | | | | 49/388 |
| 2,933,784 | A | * | 4/1960 | Hooverson | E06B 7/2309 |
| | | | | | 49/480.1 |
| 3,959,927 | A | * | 6/1976 | Good | E06B 7/16 |
| | | | | | 49/368 |
| 4,194,776 | A | * | 3/1980 | Biebuyck | E05C 19/002 |
| | | | | | 292/346 |
| 4,428,153 | A | * | 1/1984 | Klinger | E05C 19/002 |
| | | | | | 49/310 |
| 5,581,946 | A | * | 12/1996 | Lin | E05C 19/001 |
| | | | | | 49/368 |
| 9,709,316 | B2 | * | 7/2017 | Miersen | F25D 23/087 |
| 10,099,769 | B2 | * | 10/2018 | Macaraeg, Jr. | B64C 1/1461 |

(Continued)

FOREIGN PATENT DOCUMENTS

FR 3014824 B1 * 1/2016 ............... B60J 5/06
KR 200344140 Y1 3/2004

*Primary Examiner* — Jerry E Redman
(74) *Attorney, Agent, or Firm* — Mintz Levin Cohn Ferris Glovsky and Popeo, P.C.; Peter F. Corless

(57) ABSTRACT

A sealing assembly for a vehicle door may include a center bar rotatably installed on at least any one of a rear end of a front door and a front end of a rear door; a sealing member for sealing between the center bar and the rear end of the front door and between the center bar and the front end of the rear door; and an interlocking member for rotating the center bar in the direction opposite to the rotation direction of a door, among the front door and the rear door, on which the center bar has been installed so that the center bar is spaced apart from a door on which the center bar has not been installed when the door is opened or is in close contact therewith when the door is closed, when the door on which the center bar has been installed is opened or closed.

16 Claims, 15 Drawing Sheets

(56) References Cited

U.S. PATENT DOCUMENTS

2020/0189372 A1* 6/2020 Lee .......................... B60J 10/40
2020/0308882 A1* 10/2020 Salter ................... E05C 19/161

* cited by examiner

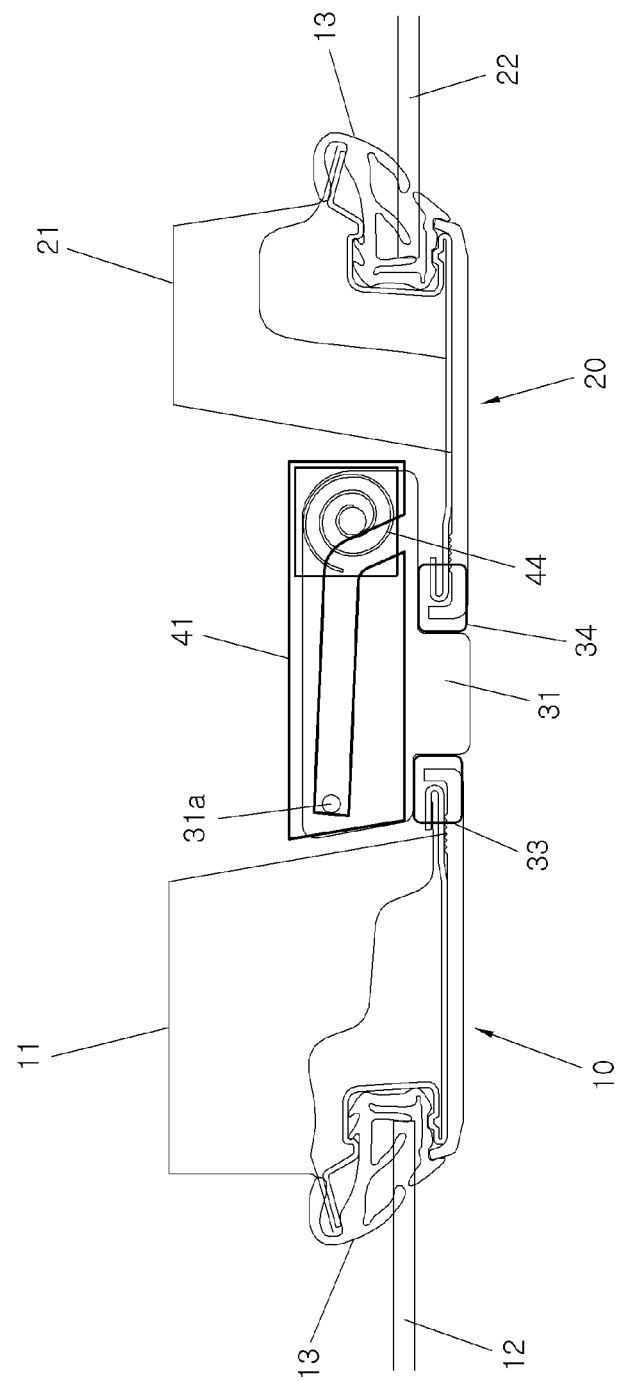

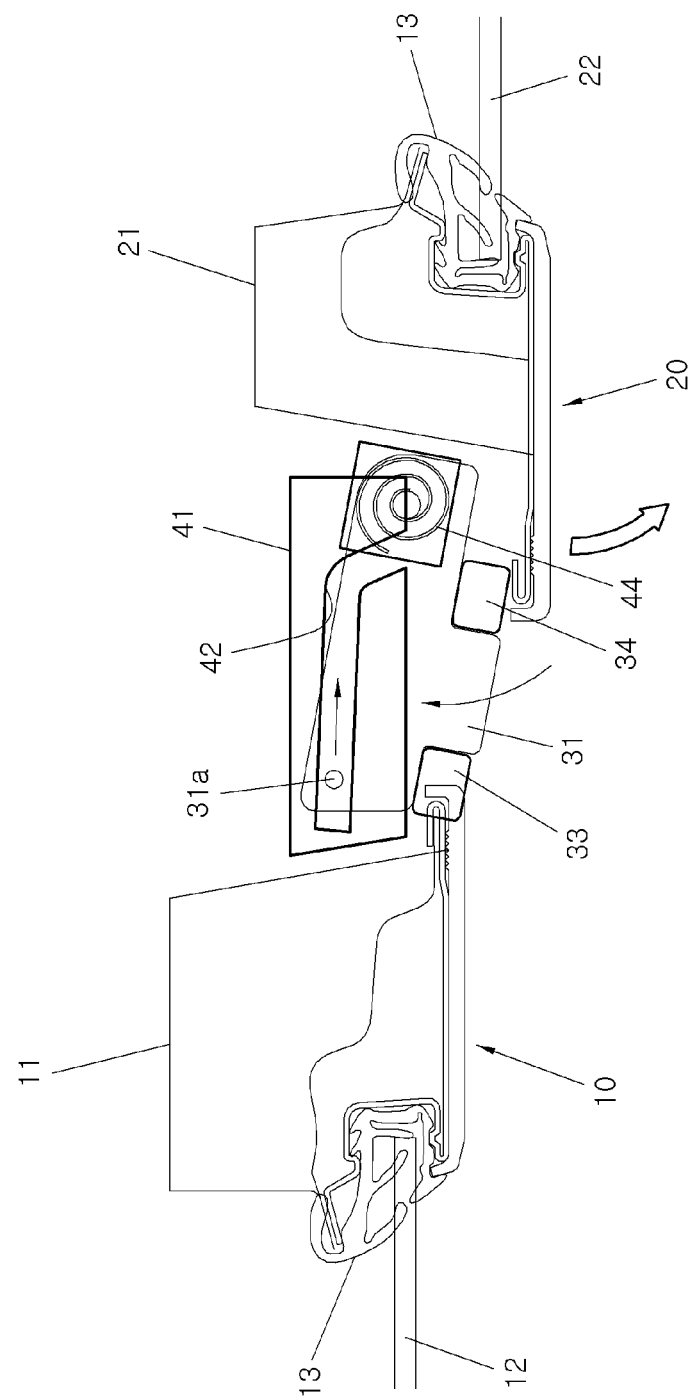

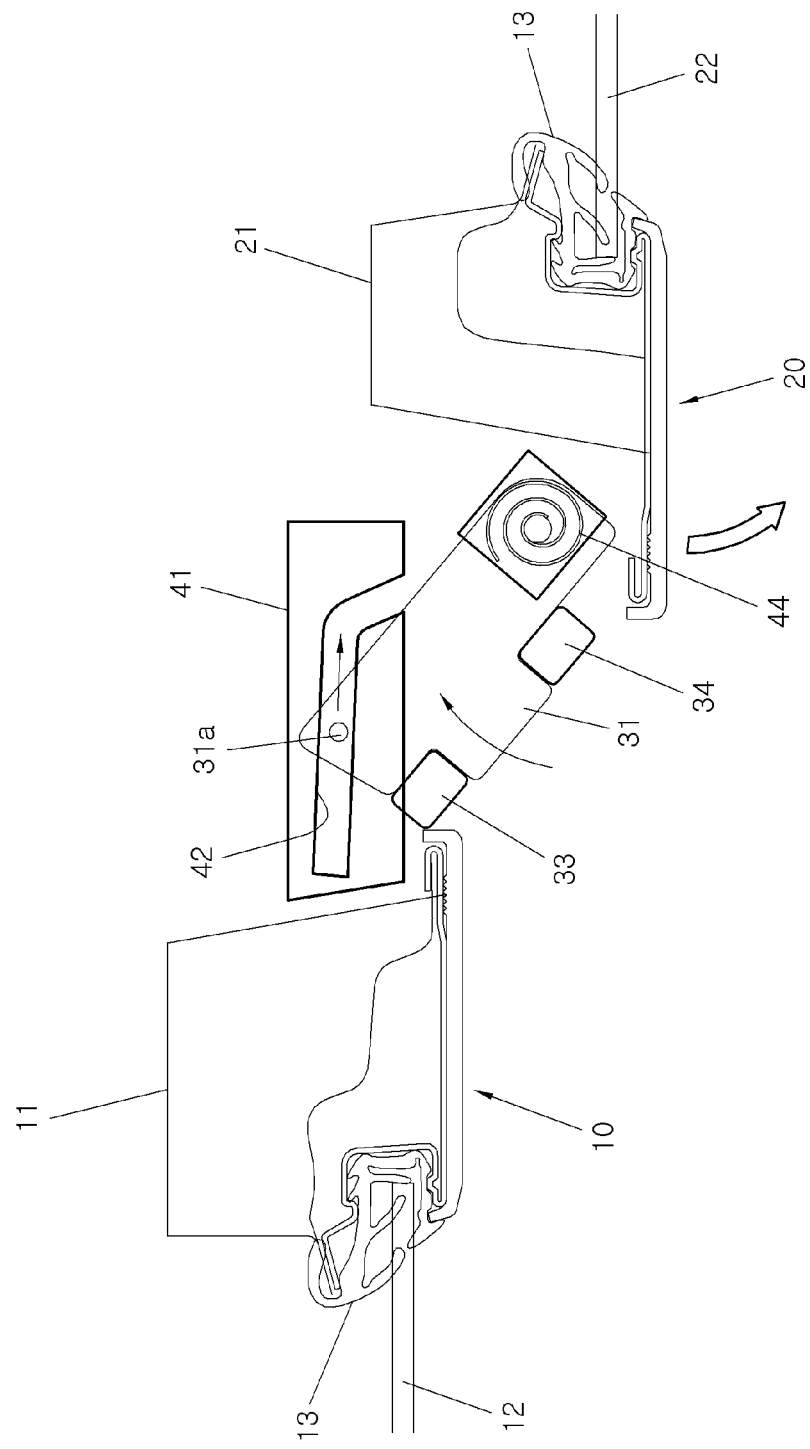

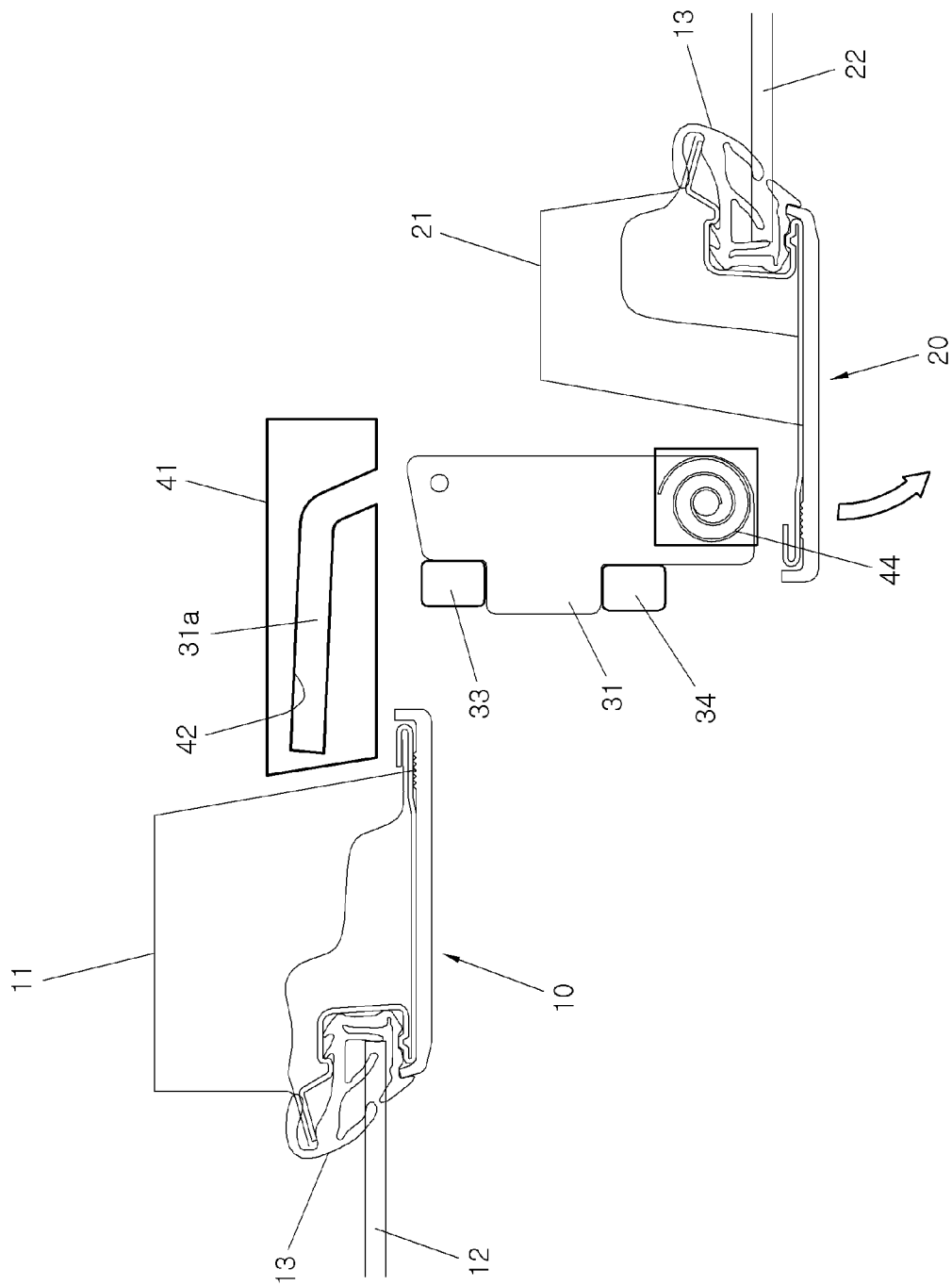

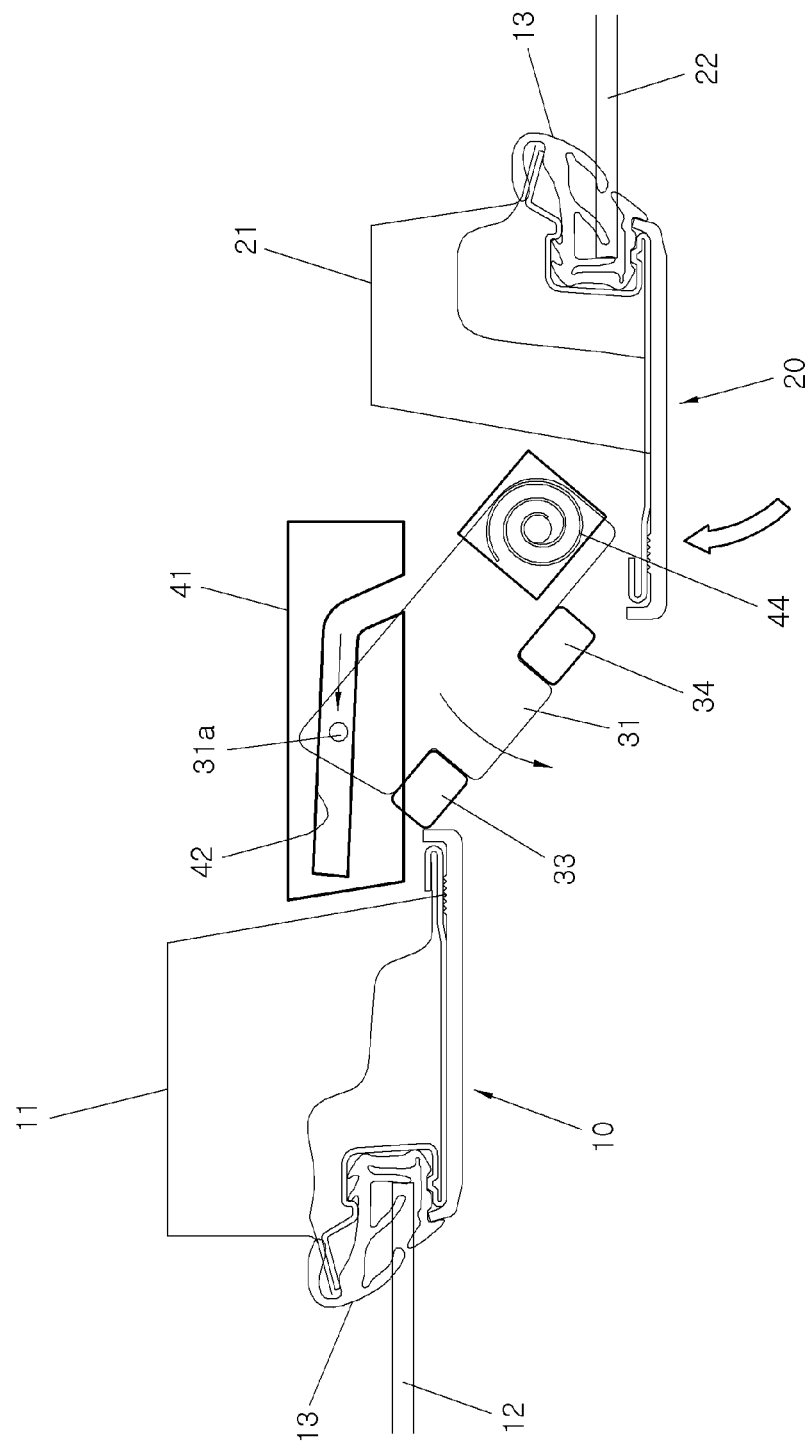

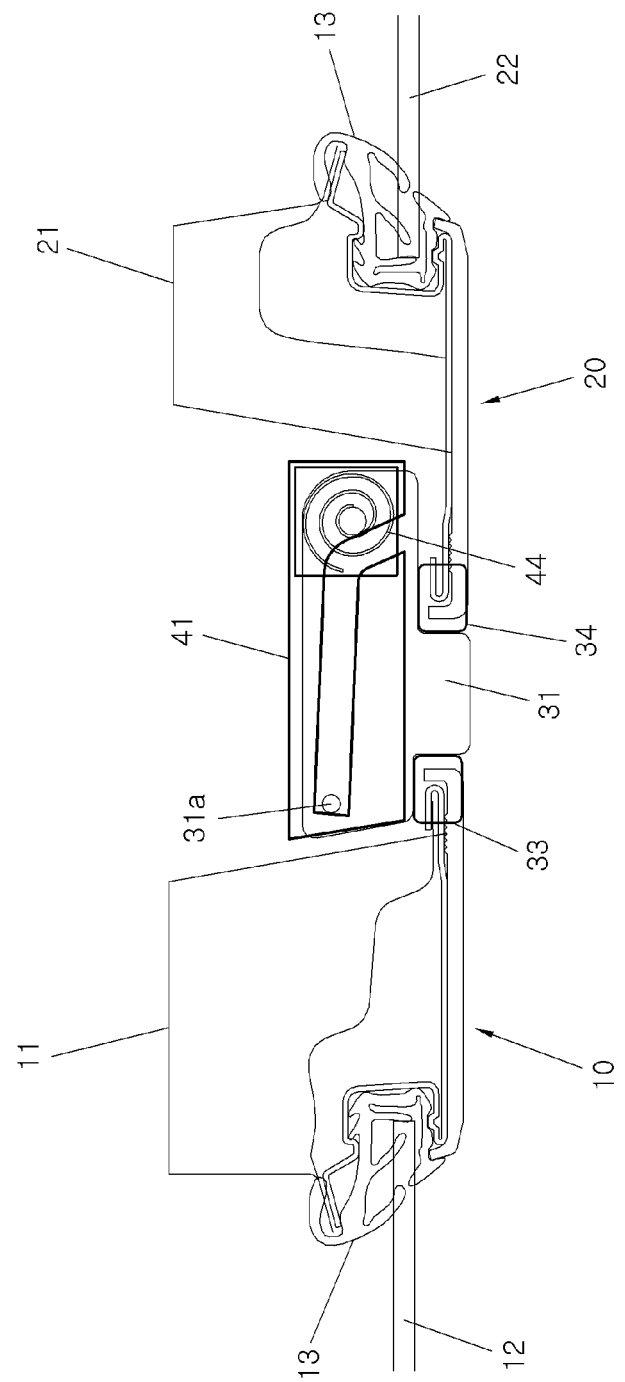

SEALING ASSEMBLY FOR VEHICLE DOOR

CROSS-REFERENCE TO RELATED APPLICATION

This application claims under 35 U.S.C. § 119(a) the benefit of Korean Patent Application No. 10-2019-0048590, filed on Apr. 25, 2019, the entire contents of which are incorporated herein by reference.

BACKGROUND

(a) Technical Field

The present disclosure relates to sealing of a door for air-tightly sealing the circumference of the door, more particularly, to a sealing assembly for a vehicle door, which air-tightly seals between a front door and a rear door by a sealing member for rotating in interlock with opening and closing of the door in a vehicle having no center pillar, and applying opposite-type swing doors, in which the front door and the rear door swing in opposite directions.

(b) Description of Related Art

A door for getting into and out of a vehicle is installed on a side surface of the vehicle.

A typical door of the vehicle is a swing door in which a front end of the door is hinge-connected to a vehicle body, and the door is opened and closed in parallel with the ground.

A weather strip of a rubber material is mounted at the circumference of the door for air-tightly sealing when the door is closed. Since the weather strip is made of a rubber material, the circumference of the door air-tightly seals while the cross section of the door is changed when the door is closed.

Meanwhile, as shown in FIG. 1 (PRIOR ART), although the front door and the rear door are hinge-connected to the vehicle in some vehicles, there is a vehicle to which an opposite-type swing door whose direction is opposite to each other, a so-called 'coach door' is applied. Particularly, some vehicles are produced without the center pillar so that a feeling of openness is maximized and the passenger can get in and out more easily.

The opposite-type swing door is the same as the typical swing door in that the door is opened in the lateral direction of the vehicle, but unlike a front door 110, there is a difference in that a rear door 120 has the rear end of the rear door 120 hinge-connected to a vehicle body, and the rear door 120 is opened while being rotated around the above. FIG. 2 (PRIOR ART) shows a portion where the rear end of the front door 110 and the front end of the rear door 120 contact each other. The front door 110 is mounted with a glass run 113 for installing a door glass 112 on a door frame 111, and mounted with a weather strip 114 on a portion contacting the rear door 120. The rear door 120 is mounted with a glass run 123 for installing a door glass 122 on a door frame 121, and mounted with another weather strip 124 on a portion contacting the front door 110.

According to such a structure, the opposite-type swing door applied to a vehicle having no center pillar has an advantage of a feeling of openness because there is no structure covering the middle portion of the vehicle when the front door 110 and the rear door 120 are opened, but has a disadvantage in that the front door 110 and the rear door 120 are opened and closed according to a predetermined order. That is, even in the opposite-type swing door, the weather strips 114, 124 for air-tightly sealing between the doors 110, 120 and the vehicle body are installed on the respective doors 110, 120, and in a position where the rear end of the front door 110 and the front end of the rear door 120 contact, the weather strips 114, 124 installed on the respective doors 110, 120 are overlapped with each other when the door is closed. For example, as shown in FIG. 2, the rear door 120 is opened and closed along the trajectory A, but since the front end of the weather strip is opened and closed along the trajectory B, the overlap between the door and the weather strip occurs between the trajectory A and the trajectory B. This overlap causes wear of the weather strip.

In order to avoid this, the opening and closing order of the front door 110 and the rear door 120 are previously determined. For example, the front door 110 is first opened when the door is opened, and the rear door 120 is first closed when the door is closed. If there is a center pillar in the vehicle 100, the front door 110 and the rear door 120 are sealed only with the center pillar, respectively, but otherwise, that is, in the vehicle having no center pillar, the front door 110 and the rear door 120 should air-tightly seal by contacting each other, such that the opening and closing order of the front door 110 and the rear door 120 should be previously determined and the air-tightly sealing between the front door 110 and the rear door 120 has been weak.

In the vehicle to which the opposite-type swing door has been applied, if the opening and closing order of the door are not kept, the opening and closing of the doors 110, 120 can be impossible. Alternatively, there is a problem in that even if the doors 110, 120 can be opened or closed, the weather strip 114 installed on the front door 110 and the weather strip 124 installed on the rear door 120 are interfered with each other, such that the weather strip is damaged and the air-tightly sealing between the doors 110, 120 and the vehicle body is not kept, thereby flowing foreign substances such as rainwater or dust therein, or transferring the external noise to the indoor of the vehicle 100.

The contents described in Description of Related Art are to help the understanding of the background of the present disclosure, and can include what is not previously known to those skilled in the art to which the present disclosure pertains.

SUMMARY

An object of the present disclosure is to provide a sealing assembly for a door of a vehicle, in which a sealing member installed between a front door and a rear door rotates in interlock with opening and closing of the door, among the front door and the rear door, when the door is opened and closed so that the door can be opened regardless of the opening and closing order of the front and rear doors.

Another object of the present disclosure is to provide a sealing assembly for a vehicle door, which reduces the phenomenon that an air-tightly sealing member installed between the front door and the rear door is abraded by friction when the door is opened and closed.

A swing-type sealing assembly for a vehicle door according to the present disclosure for achieving the objects includes, in the sealing assembly for air-tightly sealing a rear end of a front door of a vehicle and a front end of a rear door of the vehicle, includes a center bar rotatably installed on at least any one of the rear end of the front door and the front end of the rear door; a sealing member for sealing between the center bar and the rear end of the front door and between the center bar and the front end of the rear door, such that at least one of the front door and the rear door constitute a door on which the center bar has been installed; and an interlocking member for rotating the center bar in the direction opposite to the rotation direction of the door on which the center bar has been installed so that the center bar is spaced apart from the door on which the center bar has not been installed when the door is opened or is in close contact therewith when the door is closed, when the door on which the center bar has been installed is opened or closed.

The center bar has a rotary shaft installed thereon in the height direction of the vehicle, and the rotary shaft is installed at any one of the rear end of the front door and the front end of the rear door to rotate the center bar.

The interlocking member is installed adjacent to the upper end and the lower end of a portion where the front door and the rear door contact each other to interlock the center bar with the opening and closing of the door, when the door on which the center bar has been installed starts to open, or approaches the closed state.

The interlocking member is a center bar guide installed to a vehicle body to be adjacent to the upper end of the portion where the front door and the rear door contact or adjacent to the lower end thereof, and formed with a guide slot for guiding the center bar so as to rotate in the direction opposite to the rotation direction of the door when the door is opened and closed.

A guide pin protruded from the upper end and the lower end of the center bar is formed at a position spaced apart from the rotary shaft in the center bar, and the guide pin is guided by the guide slot.

The guide slot is formed with a first section formed in the width direction of the vehicle from the side surface of the center bar guide, and a second section formed in the longitudinal direction of the vehicle from the end portion of the first section.

The first section is formed to be inclined from the door where the center bar has been installed toward the door where the center bar has not been installed.

The second section is formed to be inclined from the end portion of the first section toward the inside of the vehicle in the width direction.

The second section is formed toward the door where the center bar has not been installed from the door where the center bar has been installed at the end portion of the first section.

The center bar is formed in a T shape so that a portion thereof is exposed to the side surface of the vehicle between the rear end of the front door and the front end of the rear door.

The sealing member is a first sealing member for air-tightly sealing between the rear end of the front door and the center bar, and a second sealing member for air-tightly sealing between the front end of the rear door and the center bar.

The first sealing member and the second sealing member are installed at both sides of the portion exposed to the side surface of the vehicle from the center bar, respectively.

The rotary shaft is provided with an elastic member for elastically supporting the center bar when the guide pin is detached from the guide slot.

The elastic member elastically supports so that the center bar keeps a state spaced apart from the door where the center bar has not been installed.

The center bar is rotatably installed at the front end of the rear door, and when the rear door is opened or closed, the center bar rotates to be spaced apart from the rear end of the front door when the rear door is opened or to be in close contact with the rear end of the front door when the rear door is closed.

The vehicle has no center pillar, and the rear end of the front door and the front end of the rear door are sealed by directly contacting each other.

According to the swing-type sealing assembly for the vehicle door of the present disclosure having the above-described configuration, the sealing member rotates when the door, on which the sealing member has been installed, is opened and closed, such that the sealing member does not interfere with other adjacent doors when the door is opened and closed, and air-tightly seals between the front door and the rear door when the door is closed.

It is possible to enhance the air-tightly sealing performance of the front door and the rear door in the vehicle, to which the opposite-type swing door has been applied, by the configuration in which the sealing member rotates in interlock with the rotation of the door.

In addition, friction does not substantially act because the sealing member does not contact other adjacent doors, such that the front door or the rear door can be opened regardless of the order thereof.

As described above, it is possible to open and close the door regardless of the order thereof, thereby easily getting on and off the passenger boarded on the back seat.

BRIEF DESCRIPTION OF THE DRAWINGS

FIGS. 6A to 6E are enlarged diagrams of an essential part showing an opening procedure of the rear door step by step in the vehicle to which the sealing assembly for the vehicle door according to the present disclosure has been applied.

FIGS. 7A to 7E are enlarged diagrams of an essential part showing a closing procedure of the rear door step by step in the vehicle to which the sealing assembly for the vehicle door according to the present disclosure has been applied.

DESCRIPTION OF SPECIFIC EMBODIMENTS

Figure 1:
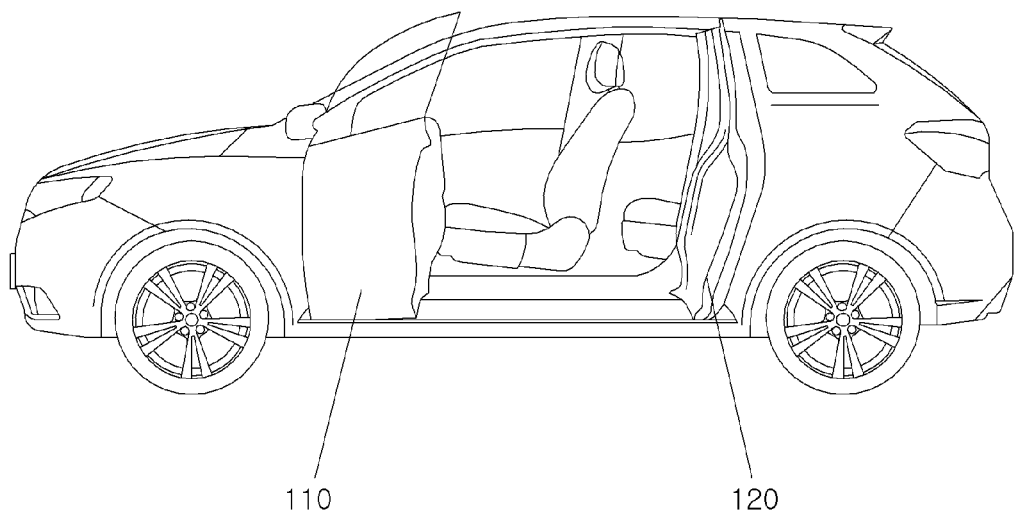
FIG. 1 (PRIOR ART) is a side diagram showing a state where a front door and a rear door have been opened in a vehicle to which an opposite-type swing door has been applied.
Figure 2:
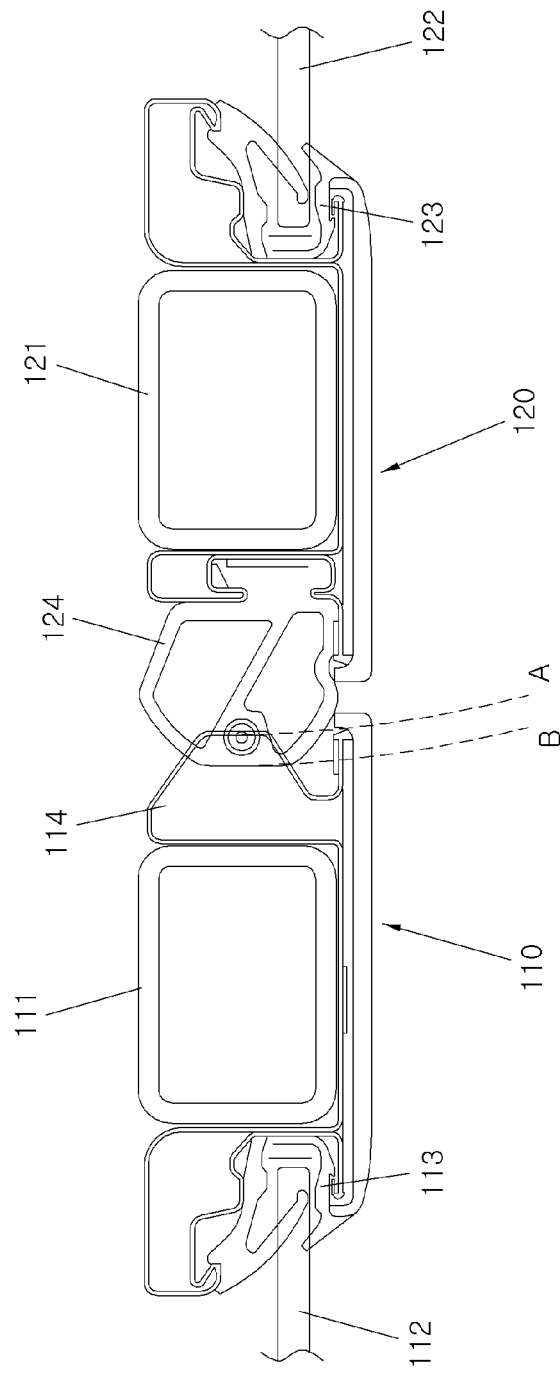
FIG. 2 (PRIOR ART) is a cross-sectional diagram illustrating a portion where the front door and the rear door contact each other in FIG. 1.
Figure 3:
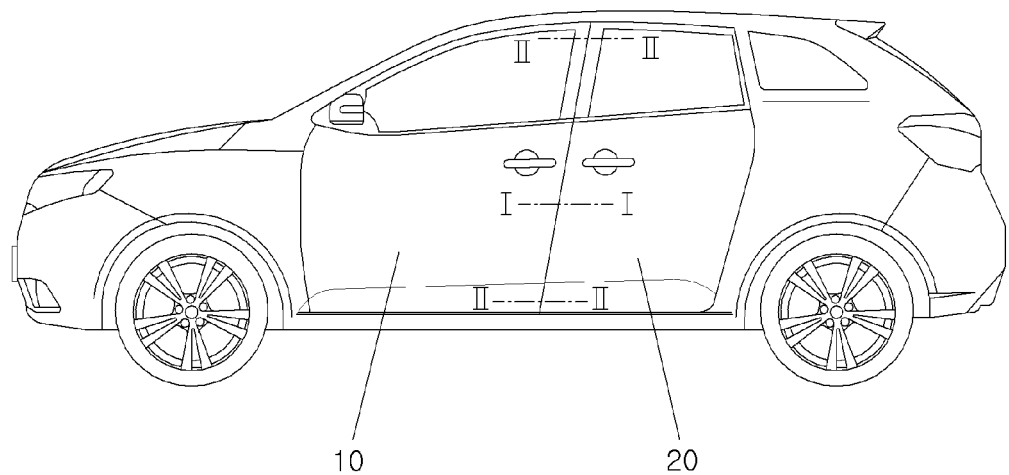
FIG. 3 is a side diagram of a vehicle to which a sealing assembly for a vehicle door according to the present disclosure has been applied.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a sealing assembly for a vehicle door according to the present disclosure will be described in detail with reference to the accompanying drawings.

A sealing assembly for a vehicle door according to the present disclosure, in the sealing assembly for air-tightly sealing between a rear end of a front door 10 of a vehicle and a front end of a rear door 20 of the vehicle, includes a center bar 31 rotatably installed on at least any one of the rear end 10A of the front door 10 and the front end 10B of the rear door 20, sealing members 33, 34 for sealing between the center bar 31 and the rear end 10A of the front door 10 and between the center bar 31 and the front end 10B of the rear door 20, and an interlocking member for rotating the center bar 31 in the direction opposite to the rotation direction of the doors 10, 20 on which the center bar 31 has been installed so that the center bar 31 is spaced apart from the doors 10, 20 on which the center bar 31 has not been installed (when the door is opened) or is in close contact with them (when the door is closed), when the doors 10, 20 on which the center bar 31 has been installed are opened or closed.

Particularly, it is preferable that the present disclosure is applied to a vehicle having no center pillar among the vehicles to which an opposite-type swing door has been applied. The reason is because, in a vehicle having no center pillar and to which the opposite-type swing door has been applied, the rear end 10A of the front door 10 and the front end 10B of the rear door 20 should directly contact each other to air-tightly seal therebetween.

Figure 4:
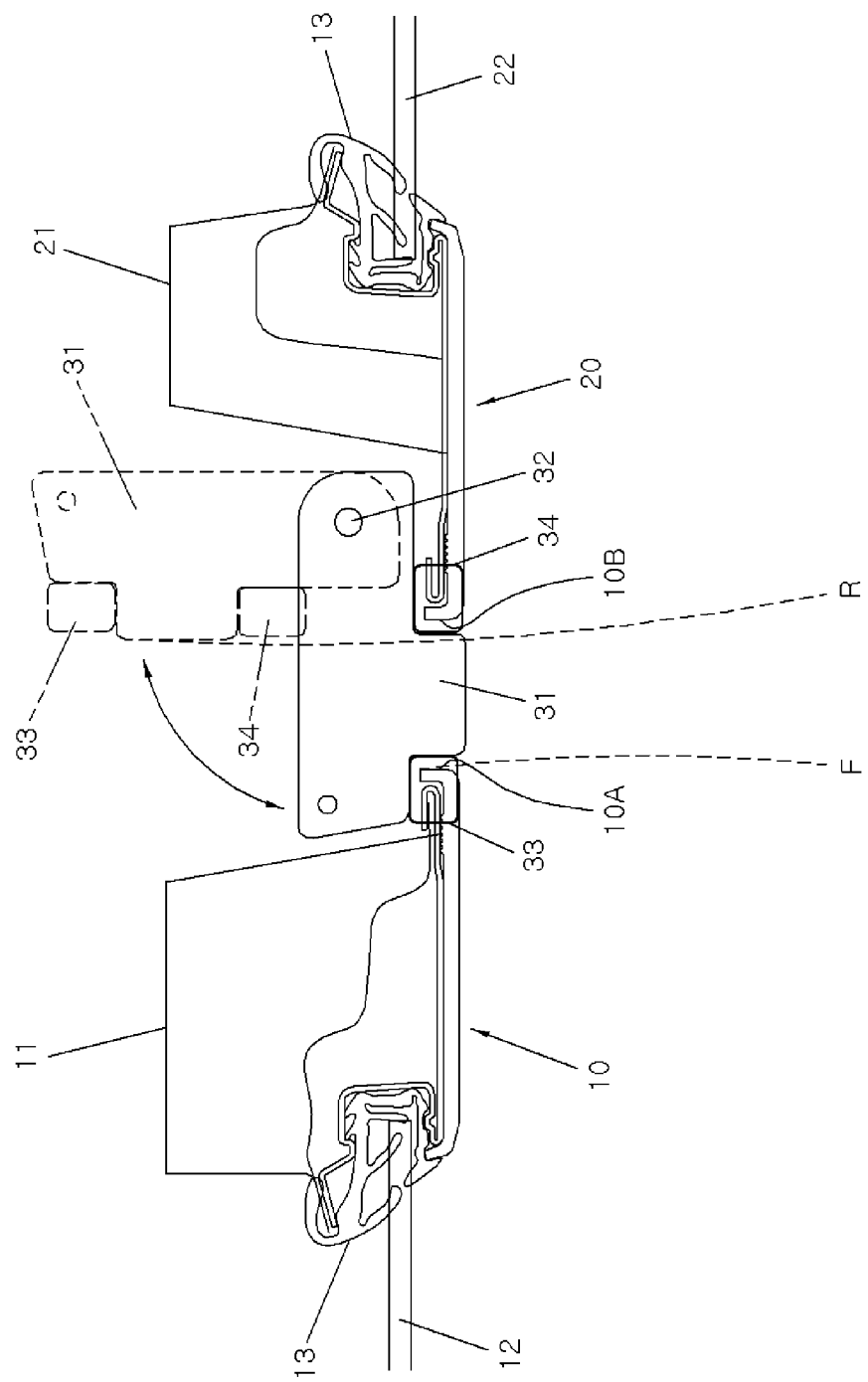
FIG. 4 is a cross-sectional diagram according to the line I-I in FIG. 3.

In addition, hereinafter, as shown in FIG. 4, a configuration in which the center bar 31 is installed at the front end 10B of the rear door 20, and the center bar 31 rotates in interlock with the opening and closing of the rear door 20 will be described as an example.

However, conversely, the center bar 31 can also be installed at the rear end 10A of the front door 10 so as to rotate in interlock with the opening and closing of the front door 10.

The front door 10 has a basic shape of the front door 10 by a door panel 11, and has a door glass 12 installed thereon through a glass run 13.

Like the front door 10, the rear door 20 has a basic shape of the rear door 20 by a door panel 21 and has a door glass 22 installed thereon through a glass run 23.

Since the present disclosure relates to the opposite-type swing door, the front door 10 has the front end connected to the vehicle body of a vehicle 1, and the rear door 20 has the rear end connected to the vehicle body. The rear end of the front door 10 and the front end of the rear door 20 air-tightly seal between the front door 10 and the rear door 20 by the sealing assembly described later.

The sealing assembly includes the center bar 31 interlocked with the opening and closing of the doors 10, 20 of any one of the front door 10 and the rear door 20, the sealing members 33, 34 for air-tightly sealing between the center bar 31 and the front door 10 or between the center bar 31 and the rear door 20, and the interlocking member for rotating the center bar 31 in interlock with the opening and closing of the doors 10, 20.

The center bar 31 is rotatably installed at the rear end of the front door 10 or the front end of the rear door 20. For example, the center bar 31 is rotatably installed at the front end of the rear door 20. The center bar 31 is formed in a predetermined cross section, and formed in the height direction of the vehicle 1. When the center bar 31 is installed on the rear door 20, the rear end of the center bar 31 or a portion adjacent to the rear end thereof is rotatably installed at the front end of the rear door 20. A rotary shaft 32 formed in the height direction of the vehicle 1 is installed at the rear end of the center bar 31 or a position adjacent to the rear end thereof, and the rotary shaft 32 is installed on the rear door 20 so that the center bar 31 has the rear end rotatably installed at the front end of the rear door 20.

The sealing members 33, 34 are made of synthetic rubber, etc. so as to air-tightly seal between the rear end of the front door 10 and the front end of the rear door 20 while the cross section thereof changes when the doors 10, 20 are opened and closed.

The sealing members 33, 34 may include the first sealing member 33 for air-tightly sealing between the center bar 31 and the rear end of the front door 10, and the second sealing member 34 for air-tightly sealing between the center bar 31 and the front end of the rear door 20.

That is, the center bar 31 can be formed in a T shape so that a portion thereof is exposed to the side surface of the vehicle 1 between the rear end of the front door 10 and the front end of the rear door 20, and the first sealing member 33 and the second sealing member 34 can be installed at both sides of the portion exposed to the side surface of the vehicle 1 from the center bar 31, respectively. That is, the first sealing member 33 for air-tightly sealing between the rear end of the front door 10 and the center bar 31 is provided at the front side thereof from the portion exposed to the side surface of the vehicle 1 from the center bar 31, and the second sealing member 34 for air-tightly sealing between the front end of the rear door 20 and the center bar 31 is provided at the rear side thereof from the portion exposed to the side surface of the vehicle 1 from the center bar 31.

The interlocking member interlocks with the rear door 20 to rotate the center bar 31 when the rear door 20 is opened or closed. The interlocking member is not configured so that the center bar 31 is interlocked with the opening and closing of the rear door 20 in the overall section when the rear door 20 is opened and closed, and configured so that the center bar 31 is interlocked with the center bar 31 at the early opening of the rear door 20 or immediately before the closing thereof.

As a specific example of the interlocking member, it may be a center bar guide 41 having a guide slot 42 formed thereon.

The center bar guide 41 forms an outer shape. The center bar guide 41 is installed on the vehicle body to be adjacent to the vehicle body, that is, the upper end of a portion where the front door 10 and the rear door 20 contact each other, or adjacent to the lower end thereof. Therefore, the position of the center bar guide 41 is not changed even when the front door 10 and the rear door 20 are opened and closed.

Figure 5:
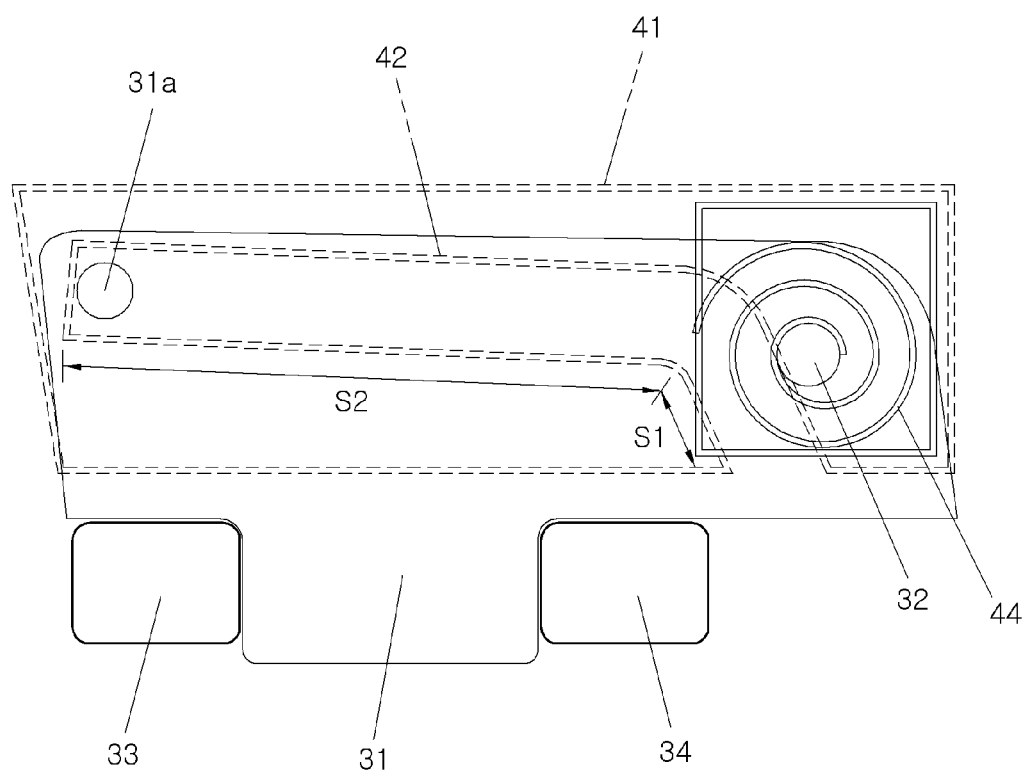
FIG. 5 is a cross-sectional diagram according to the line II-II in FIG. 4.

The portion where the front door 10 and the rear door 20 contact mostly has the cross section as in FIG. 4, but the upper end and the lower end thereof have a structure in which the center bar guide 41 has been applied (see FIG. 5).

The guide slot 42 guides the front end of the center bar 31 so that the center bar 31 rotates in the direction opposite to the rear door 20. That is, the center bar 31 has the rear end rotatably installed on the rear door 20, and the guide slot 42 guides it in a state where the front end of the center bar 31 has been restrained by the guide slot 42 so that the center bar 31 is rotated in the direction opposite to the rotation direction of the rear door 20.

Firstly, the upper end and the lower end of the center bar 31 are inserted into the guide slot 42 to move along the trajectory of the guide slot 42.

Specifically reviewing the form of the guide slot 42, the guide slot 42 is continuously formed with two sections of a first section S1 formed in the width direction of the vehicle 1 from the side surface of the center bar guide 41, and a second section S2 formed in the longitudinal direction of the vehicle 1 from the end portion of the first section S1. The first section S1 is a section where a guide pin 31a enters the guide slot 42, or is discharged from the guide slot 42, and the second section S2 restricts the front end of the center bar 31 upon the rotation of the rear door 20 to rotate the center bar 31 when the rear door 20 is opened and closed.

The first section S1 is formed toward the inside from the outside of the vehicle in the width direction, and formed to be slightly inclined forwardly from the vehicle so that the guide pin 31a can move smoothly.

The second section S2 is formed in the direction from the rear door 20 toward the front door 10 along the longitudinal direction of the vehicle at the end portion of the first section S1. The second section S2 is also formed to be slightly inclined toward the inside of the vehicle 1 in the width direction for the smooth movement of the center bar 31.

A spring 44 is installed on the rotary shaft 32 to keep the rotated state so that the center bar 31 is spaced apart from the front door 10 when the guide pin 31a is detached from the guide slot 42.

That is, the spring 44 is installed at the upper end or the lower end of the rotary shaft 32 to elastically support the center bar 31 so as to be always rotated in the direction spaced apart from the front door 10. The guide pin 31a is restricted by the guide slot 42 in a state where the guide pin 31a has be positioned inside the guide slot 42, but in the state where the guide pin 31a has been detached from the guide slot 42, the elastic member, that is, the spring 44 elastically supports so as to become a state perpendicular to the rear door 20. This is for preventing such a problem because it is impossible to re-enter it when the guide pin 31a re-enters the guide slot 42 (when the rear door 20 is closed) if the position of the center bar 31 is not constant in the state where the guide pin 31a has been detached from the guide slot 42.

The spring 44 can be installed inside a spring housing 43 to have one end fixed to the spring housing 43, and have the other end fixed to the rotary shaft 32 to elastically support the center bar 31.

An operation of the sealing assembly for the vehicle door according to the present disclosure having the above-described configuration will be described.

FIGS. 6A to 6E are diagrams showing a procedure in which the rear door 20 is opened from a state where both the front door 10 and the rear door 20 have been closed.

The center bar 31 is in close contact with the rear end of the front door 10 and the front end of the rear door 20 in the state where the rear door 20 has been closed (see FIG. 6A). Therefore, between the center bar 31 and the front door 10 has been air-tightly sealed by the first sealing member 33, and between the center bar 31 and the rear door 20 has been air-tightly sealed by the second sealing member 34.

Figure 6D:
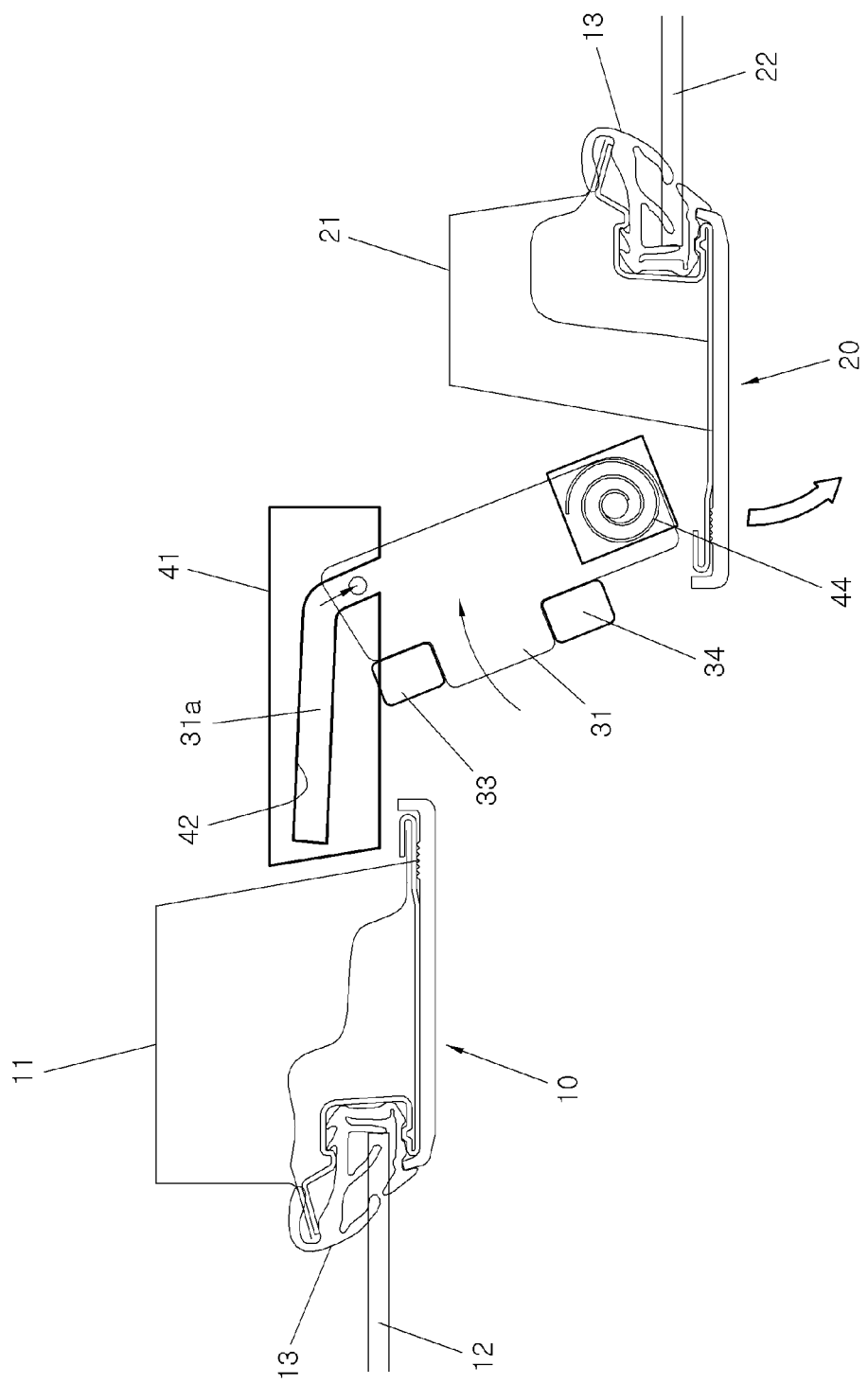

When the passenger opens the rear door 20 in a state where the rear door 20 has been closed, the rear door 20 starts to rotate around the rear end of the rear door 20. As shown in FIG. 6B, when the rear door 20 starts to rotate for opening, the portion of the center bar 31 where the rotary shaft 32 has been installed starts to move along with the front end of the rear door 20, and the guide pin 31a starts to move along the guide slot 42 from the inside end portion of the second section S2 toward the first section S1 in the guide slot 42. At this time, the center bar 31 rotates in the direction opposite to the rear door 20. That is, in FIGS. 6B to 6D, the rear door 20 rotates counterclockwise, but the center bar 31 rotates clockwise.

As shown in FIGS. 6C and 6D, when the opening of the rear door 20 further proceeds, the amount of rotation of the center bar 31 also increases as the amount of rotation of the rear door 20 increases.

When the rear door 20 continues to be opened and the guide pin 31a passes through the first section S1 to be detached from the guide slot 42, the center bar 31 maximally rotates by the spring 44, and therefore, the center bar 31 keeps the maximally rotated state. In this state, the rear door 20 is rotated by the passenger to open the rear door 20.

Meanwhile, when the front door 10 is opened in a state where both the front door 10 and the rear door 20 have been closed (not shown), the front door 10 is opened and the front door 10 can be spaced apart from the first sealing member 33 and the center bar 31 to be opened.

Since the first sealing member 33 and the center bar 31 are positioned inside the vehicle in the width direction at the rear end of the front door 10, the front door 10 can be opened without being restricted by the first sealing member 33 and the center bar 31.

As described above, since the front door 10 and the rear door 20 are not interfered with each other because their end portions are opened, respectively, through the trajectories F, R in FIG. 4.

FIGS. 7A to 7E are diagrams showing the procedure in which the rear door 20 is closed from a state where the rear door 20 has been opened.

Figure 7A:
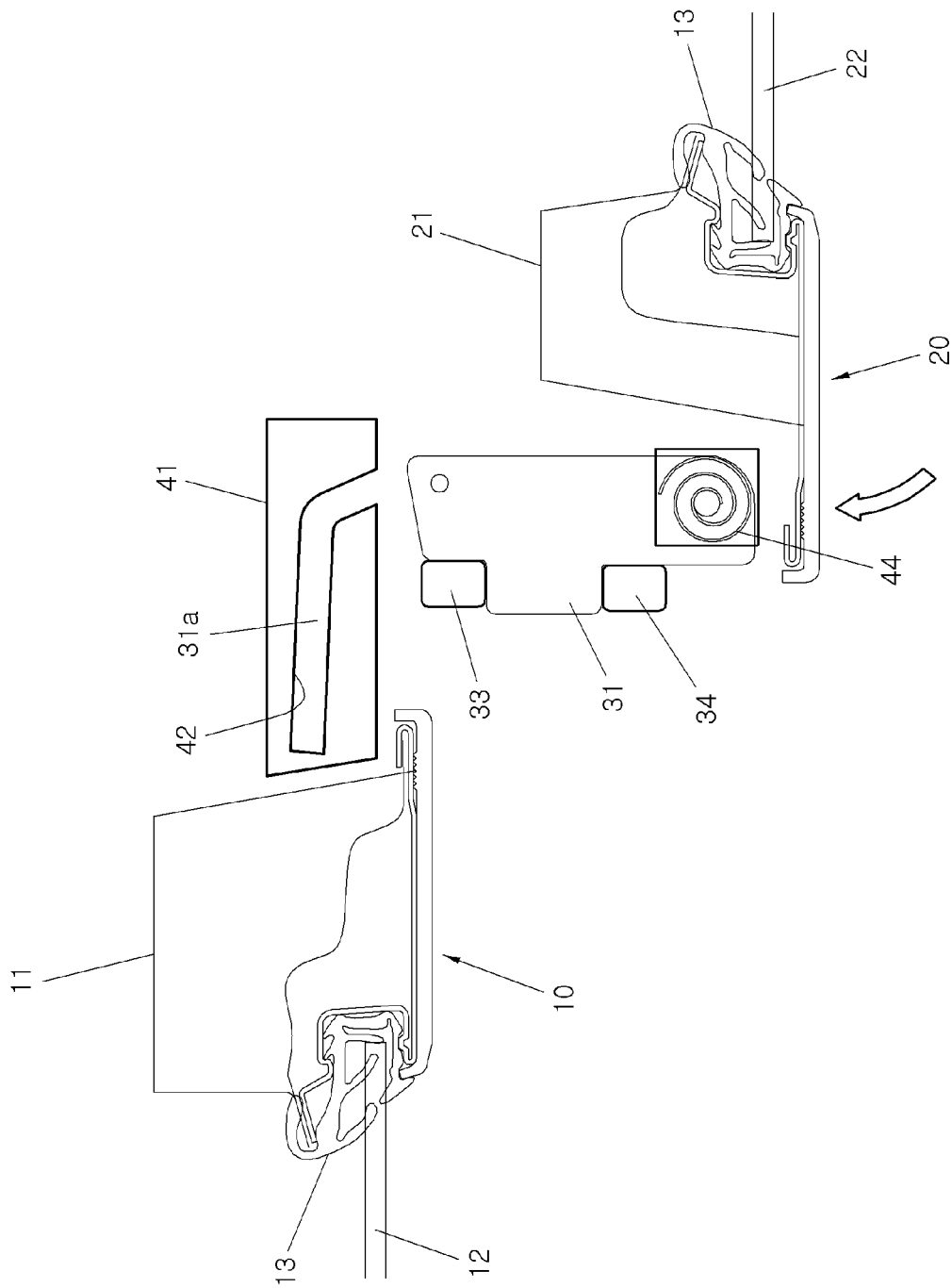

When the rear door 20 is closed by the passenger in a state where the rear door 20 has been opened, the rear door 20 rotates around the rear end thereof (see FIG. 7A). The center bar 31 keeps the state rotated by the spring 44 in the state where the rear door 20 has been opened.

Figure 7B:
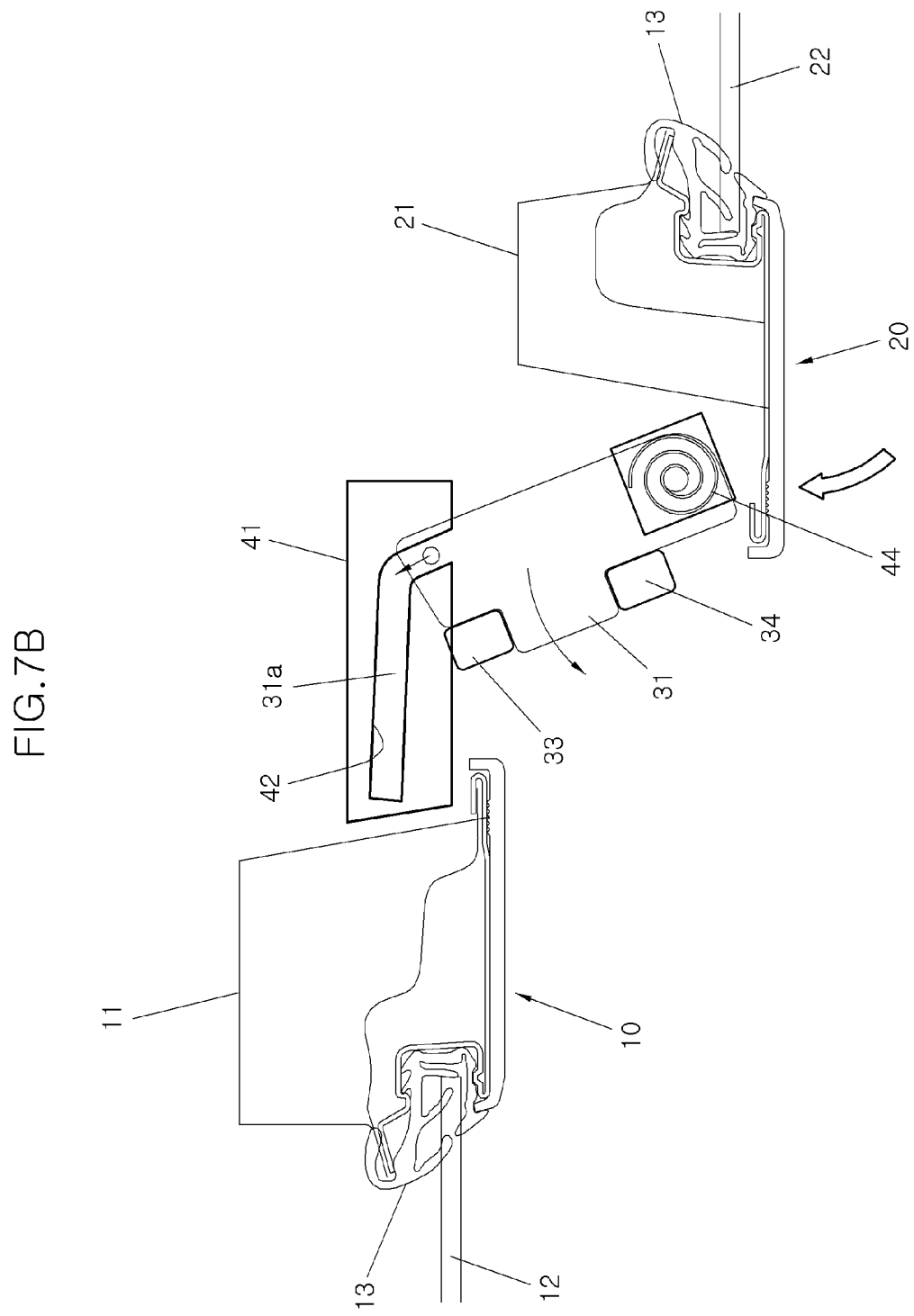
Figure 7D:
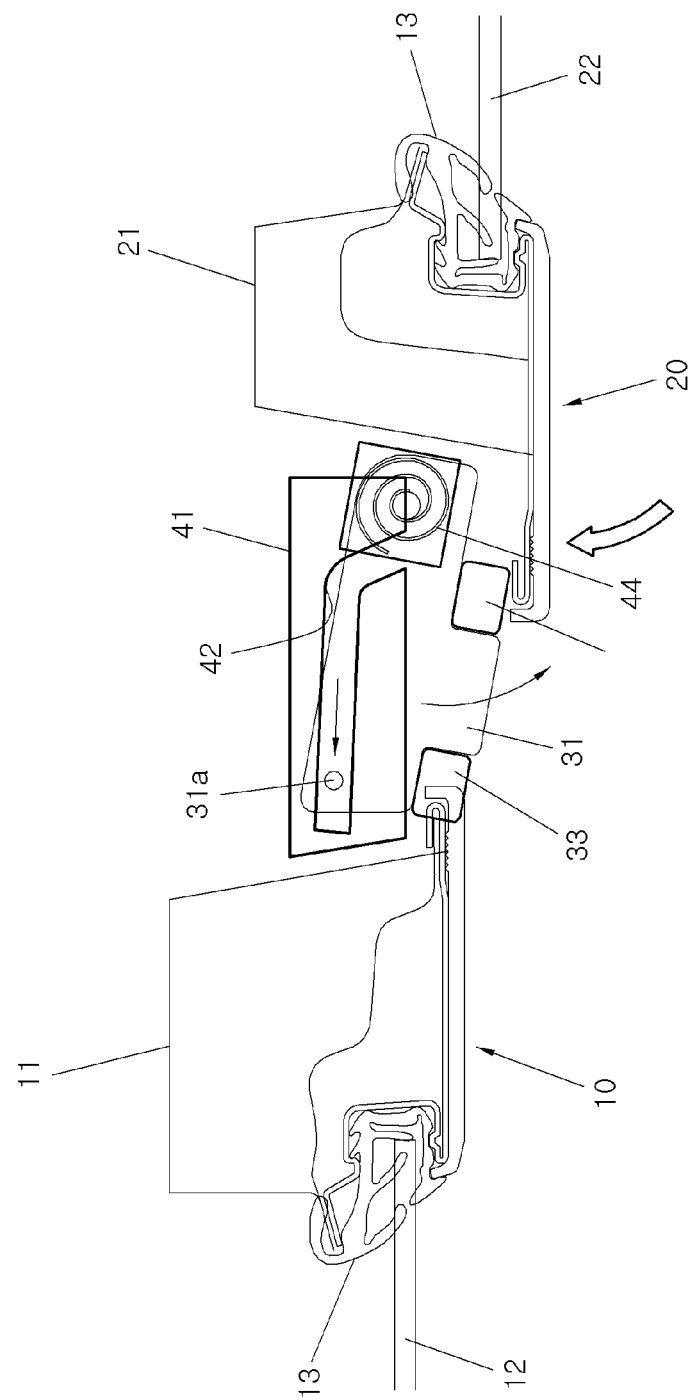

When the rear door 20 is adjacent to the vehicle body as the rear door 20 is closed, the guide pin 31a of the center bar 31 enters the guide slot 42 to move the section S1 (FIG. 7B).

Hereinafter, as the rear door 20 continues to be closed, the guide pin 31a formed on the center bar 31 is guided by the guide slot 42 to move along the second section S2, and the portion where the rotary shaft 32 has been formed rotates together with the front end of the rear door 20. Since both ends of the center bar 31 move or rotate in the direction opposite to each other, the center bar 31 rotates in the direction opposite to that when the rear door 20 is opened. For example, in FIGS. 7A to 7D, when the rear door 20 rotates clockwise, the center bar 31 rotates counterclockwise.

When the rear door 20 rotates so as to approach the closed state as the rear door 20 is further closed, the guide pin 31a moves toward the inside end portion of the second section S2 of the guide slot 42, and as the amount of rotation of the center bar 31 increases, the center bar 31 rotates in the direction opposite to the rear door 20, and the rear door 20 is closed.

When the rear door 20 is completely closed, the guide pin 31a is positioned at the innermost portion of the guide slot 42, that is, the inside end portion of the second section S2, and the center bar 31 and the rear door 20 are in a side-by-side relationship. Therefore, between the center bar 31 and the rear end of the front door 10 is air-tightly sealed by the first sealing member 33, and between the center bar 31 and the front end of the rear door 20 is air-tightly sealed by the second sealing member 34.

Meanwhile, when the front door 10 is closed (not shown), if the front door 10 is closed by the passenger in the state where the front door 10 has been opened, the rear end of the front door 10 is closed in the form of covering the center bar 31 at the outside of the center bar 31. Therefore, even in the state where the front door 10 is closed, the front door 10 can be closed without being restricted by the first sealing member 33 and the center bar 31.

As described above, the front door 10 and the rear door 20 are not interfered with each other because their end portions are closed, respectively, through the trajectories F, R in FIG. 4.

As described above, in the vehicle to which the opposite-type swing door is applied and having the center pillar, when the rear door 20 is opened and closed, the front end of the rear door 20 does not interfere with the rear end of the front door 10, such that the front door 10 and the rear door 20 can be independently opened and closed.

Therefore, since the rear door 20 can be opened and closed even without opening the front door 10 when the passenger boarded on the back seat gets on and off, getting on and off becomes convenient.

What is claimed is:

1. A sealing assembly for a vehicle door, comprising:
   in the sealing assembly for the vehicle door for air-tightly sealing a rear end of a front door of a vehicle and a front end of a rear door of the vehicle,
   a center bar rotatably installed on at least any one of the rear end of the front door and the front end of the rear door, such that at least one of the front door and the rear door constitute a door on which the center bar has been installed;
   a sealing member for sealing between the center bar and the rear end of the front door and between the center bar and the front end of the rear door; and
   an interlocking member for rotating the center bar in a direction opposite to a rotation direction of the door on which the center bar has been installed so that the center bar is spaced apart from the door on which the center bar has not been installed when the door on which the center bar has been installed is opened or is in close contact therewith when the door on which the center bar has been installed is closed, when the door on which the center bar has been installed is opened or closed.

2. The sealing assembly for the vehicle door of claim 1, wherein the center bar has a rotary shaft installed thereon in a height direction of the vehicle, and the rotary shaft is installed at any one of the rear end of the front door and the front end of the rear door to rotate the center bar.

3. The sealing assembly for the vehicle door of claim 2, wherein the interlocking member is installed adjacent to an upper end and a lower end of a portion where the front door and the rear door contact each other to interlock the center bar with the opening and closing of the door on which the center bar has been installed, when the door on which the center bar has been installed starts to open, or approaches the closed state.

4. The sealing assembly for the vehicle door of claim 3, wherein the interlocking member is a center bar guide installed to a vehicle body to be adjacent to the upper end of the portion where the front door and the rear door contact or adjacent to the lower end thereof, and formed with a guide slot for guiding the center bar so as to rotate in the direction opposite to the rotation direction of the door on which the center bar has been installed when the door on which the center bar has been installed is opened and closed.

5. The sealing assembly for the vehicle door of claim 4, wherein a guide pin protruded from the upper end and the lower end of the center bar is formed at a position spaced apart from the rotary shaft in the center bar, and wherein the guide pin is guided by the guide slot.

6. The sealing assembly for the vehicle door of claim 5, wherein the guide slot is formed with a first section formed in a width direction of the vehicle from the side surface of the center bar guide, and
a second section formed in a longitudinal direction of the vehicle from the end portion of the first section.

7. The sealing assembly for the vehicle door of claim 6, wherein the first section is formed to be inclined from the door where the center bar has been installed toward the door where the center bar has not been installed.

8. The sealing assembly for the vehicle door of claim 6, wherein the second section is formed to be inclined from the end portion of the first section toward an inside of the vehicle in the width direction.

9. The sealing assembly for the vehicle door of claim 6, wherein the second section is formed toward the door where the center bar has not been installed from the door where the center bar has been installed at the end portion of the first section.

10. The sealing assembly for the vehicle door of claim 5, wherein the rotary shaft is provided with an elastic member for elastically supporting the center bar when the guide pin is detached from the guide slot.

11. The sealing assembly for the vehicle door of claim 10, wherein the elastic member elastically supports so that the center bar keeps a state spaced apart from the door where the center bar has not been installed.

12. The sealing assembly for the vehicle door of claim 1, wherein the center bar is formed in a T shape so that a portion thereof is exposed to a side surface of the vehicle between the rear end of the front door and the front end of the rear door.

13. The sealing assembly for the vehicle door of claim 12, wherein the sealing member is a first sealing member for air-tightly sealing between the rear end of the front door and the center bar, and
a second sealing member for air-tightly sealing between the front end of the rear door and the center bar.

14. The sealing assembly for the vehicle door of claim 13, wherein the first sealing member and the second sealing member are installed at both sides of the portion exposed to the side surface of the vehicle from the center bar, respectively.

15. The sealing assembly for the vehicle door of claim 1, wherein the center bar is rotatably installed at the front end of the rear door, and
wherein when the rear door is opened or closed, the center bar rotates to be spaced apart from the rear end of the front door when the rear door is opened or to be in close contact with the rear end of the front door when the rear door is closed.

16. The sealing assembly for the vehicle door of claim 1, wherein the vehicle has no center pillar, and the rear end of the front door and the front end of the rear door are sealed by contacting each other through the center bar.

* * * * *